US008007754B2

(12) United States Patent
Yoon et al.

(10) Patent No.: US 8,007,754 B2
(45) Date of Patent: Aug. 30, 2011

(54) SEPARATION OF DIAMOND FROM GANGUE MINERALS

(75) Inventors: Roe Hoan Yoon, Blacksburg, VA (US); Dmitri Kouznetsov, Aurora, IL (US)

(73) Assignee: Mineral and Coal Technologies, Inc., Blacksburg, VA (US)

(*) Notice: Subject to any disclaimer, the term of this patent is extended or adjusted under 35 U.S.C. 154(b) by 369 days.

(21) Appl. No.: 11/347,814

(22) Filed: Feb. 3, 2006

(65) Prior Publication Data
US 2006/0251566 A1 Nov. 9, 2006

Related U.S. Application Data

(60) Provisional application No. 60/649,952, filed on Feb. 4, 2005.

(51) Int. Cl.
B01J 3/06 (2006.01)
(52) U.S. Cl. ........................................ 423/446
(58) Field of Classification Search .................. None
See application file for complete search history.

(56) References Cited

U.S. PATENT DOCUMENTS

| | | | |
|---|---|---|---|
| 1,064,723 A | 6/1913 | Greenway et al. | |
| 1,102,873 A | 7/1914 | Chapman et al. | |
| 1,208,171 A | 12/1916 | Lavers et al. | |
| 1,452,662 A | 4/1923 | Smith | |
| 2,120,217 A | 6/1938 | Harris | 209/166 |
| 2,162,494 A | 6/1939 | Trotter et al. | 209/166 |
| 2,188,882 A | 1/1940 | Clocker | 260/405 |
| 2,188,883 A | 1/1940 | Clocker | 260/341 |
| 2,188,885 A | 1/1940 | Clocker | 260/410 |
| 2,188,889 A | 1/1940 | Clocker | 260/414 |
| 2,864,765 A | 12/1958 | Stoneman et al. | 210/43 |
| 2,934,208 A | 4/1960 | Schoeld et al. | 209/166 |
| 2,957,576 A | 10/1960 | Henderson | 209/167 |
| 3,072,256 A | 1/1963 | Gotte et al. | |
| 3,102,064 A | 8/1963 | Wurzburg et al. | 162/158 |
| 3,464,551 A | 9/1969 | Falvey | 209/166 |
| 3,480,143 A | 11/1969 | Mitzmager et al. | 209/166 |
| 3,640,385 A | 2/1972 | Smith et al. | 209/166 |
| 3,779,380 A | 12/1973 | Bishop | 209/166 |
| 3,821,069 A | 6/1974 | Wurzburg | 162/158 |
| 3,880,824 A | 4/1975 | Rao et al. | 260/112 |
| 3,964,997 A | 6/1976 | Weston | 209/166 |
| 3,968,005 A | 7/1976 | Wurzburg | 162/158 |
| 3,993,345 A | 11/1976 | Croup | 296/37.16 |
| 4,039,466 A | 8/1977 | Matsuda et al. | 252/194 |
| 4,040,900 A | 8/1977 | Mazzarella et al. | 162/158 |
| 4,110,207 A | 8/1978 | Wang et al. | 209/166 |
| 4,144,969 A | 3/1979 | Snow | 209/166 |
| 4,156,649 A | 5/1979 | Quinn et al. | 210/51 |
| 4,191,655 A | 3/1980 | Quinn et al. | 252/60 |
| 4,206,063 A | 6/1980 | Wang et al. | 252/60 |
| 4,207,186 A | 6/1980 | Wang et al. | 210/54 |
| 4,210,531 A | 7/1980 | Wang et al. | 210/51 |
| 4,278,208 A | 7/1981 | Falcon-Steward | 241/16 |
| 4,287,053 A | 9/1981 | Lehr et al. | 209/167 |
| 4,308,133 A | 12/1981 | Meyer | 209/166 |
| 4,324,653 A | 4/1982 | Henchiri et al. | 209/167 |
| 4,376,011 A | 3/1983 | Menschhorn et al. | 162/5 |
| 4,410,431 A | 10/1983 | Roe | 210/728 |
| 4,415,337 A | 11/1983 | Kutta et al. | 44/24 |
| 4,430,238 A | 2/1984 | Hellsten et al. | 252/61 |
| 4,447,344 A | 5/1984 | Roe | 252/60 |
| 4,507,198 A | 3/1985 | Unger et al. | 209/166 |
| 4,511,461 A * | 4/1985 | Kruyer | 209/47 |
| 4,526,680 A | 7/1985 | Owen | 209/166 |
| 4,532,032 A | 7/1985 | Ng et al. | 209/166 |
| 4,561,953 A | 12/1985 | Muralidhara et al. | 204/182.3 |
| 4,582,596 A | 4/1986 | Hansen et al. | 209/284 |
| 4,589,980 A | 5/1986 | Keys | 209/166 |
| 4,606,773 A | 8/1986 | Novak | 106/213 |
| 4,678,561 A | 7/1987 | Keys | 209/166 |
| 4,678,562 A | 7/1987 | Keys | 209/166 |
| 4,678,563 A | 7/1987 | Keys | 209/166 |
| 4,687,519 A | 8/1987 | Trzasko et al. | 106/211 |
| 4,690,752 A | 9/1987 | Shaw | 209/5 |
| 4,701,257 A | 10/1987 | Hefner, Jr. | 209/166 |
| 4,770,766 A | 9/1988 | Keller, Jr. et al. | 209/5 |

(Continued)

FOREIGN PATENT DOCUMENTS

| | | |
|---|---|---|
| CL | 32098 | 6/1980 |
| CL | 35255 | 4/1986 |
| CL | 35536 | 9/1986 |
| CL | 1503-1994 | 12/1995 |
| CL | 1112-1995 | 5/1996 |
| CL | 1152-97 | 6/1997 |
| DE | 3107305 A1 | 9/1982 |
| DE | 3517154 A1 | 11/1986 |
| EP | 1174231 | 1/2002 |
| GB | 738061 | 10/1955 |

(Continued)

OTHER PUBLICATIONS

Abstract only of: Kashkarov, et al., "Evaluation of the collecting properties of tall oil soap and aerofloat during the flotation of diamond from a titanium-zirconium alluvial deposit benefications product." No. 5, Trudi Institutu Mineral'nikh Resursiv, 81-8 (1971) (1 page).

Abstract only of: Nakahiro, et al., "Effect of some depressants on removal of unreacted graphite from raw synthesized diamond by flotation method." 111(2), Fac. Eng., Kyoto University, 92-6, (1995) (1 page).

(Continued)

Primary Examiner — Melvin C Mayes
Assistant Examiner — Sheng H Davis
(74) Attorney, Agent, or Firm — Grossman, Tucker, Perreault & Pfleger, PLLC

(57) ABSTRACT

The present invention relates to a method for separating diamond from gangue minerals. In particular, this method relates to the addition of a first reagent or reagents which contact the diamond in diamond ore slurry to at least partially remove hydrophilic coatings from the diamond surfaces. A second reagent or reagents may also be added to the slurry so that the reagent may adsorb on the diamond surfaces and thereby enhance the hydrophobicity of diamonds. The increase in hydrophobicity may improve the flotation of diamonds.

16 Claims, No Drawings

U.S. PATENT DOCUMENTS

| | | | |
|---|---|---|---|
| 4,857,149 A | 8/1989 | Tiedeman et al. | 162/158 |
| 4,857,221 A | 8/1989 | Brookes et al. | 252/61 |
| 4,859,318 A | 8/1989 | Brookes et al. | 209/166 |
| 4,866,856 A | 9/1989 | Feeley | 34/9 |
| 4,902,764 A | 2/1990 | Rothenberg et al. | 526/240 |
| 4,956,077 A | 9/1990 | Barwise | 209/166 |
| 4,966,712 A | 10/1990 | Nishibayashi et al. | 210/705 |
| 4,969,928 A | 11/1990 | Wen et al. | 44/568 |
| 4,976,781 A * | 12/1990 | Mainwaring et al. | 75/710 |
| 5,011,612 A | 4/1991 | Keeney | 210/712 |
| 5,048,199 A | 9/1991 | Cole | 34/9 |
| 5,057,209 A | 10/1991 | Klimpel et al. | 209/167 |
| 5,108,585 A | 4/1992 | Von Rybinski et al. | 209/166 |
| 5,161,694 A | 11/1992 | Yoon et al. | 209/5 |
| 5,167,831 A | 12/1992 | Dimas | 210/728 |
| 5,215,669 A | 6/1993 | Koester et al. | 210/729 |
| 5,256,169 A | 10/1993 | Roe | 44/626 |
| 5,283,322 A | 2/1994 | Martin et al. | 530/374 |
| 5,346,630 A | 9/1994 | Kenney | 210/770 |
| 5,368,745 A * | 11/1994 | Rothenberg et al. | 210/734 |
| 5,379,902 A | 1/1995 | Wen et al. | 209/166 |
| 5,405,554 A | 4/1995 | Neff et al. | 252/309 |
| 5,407,080 A | 4/1995 | Welch et al. | 209/166 |
| 5,441,156 A | 8/1995 | Fabry et al. | 209/166 |
| 5,443,158 A | 8/1995 | McKenny et al. | 209/166 |
| 5,458,786 A | 10/1995 | Yoon et al. | 210/711 |
| 5,510,003 A | 4/1996 | Colasurdo et al. | 162/158 |
| 5,544,760 A | 8/1996 | Benn et al. | 209/166 |
| 5,587,786 A | 12/1996 | Champagne et al. | 356/121 |
| 5,609,983 A * | 3/1997 | Kawamura et al. | 430/193 |
| 5,670,056 A | 9/1997 | Yoon et al. | 210/728 |
| 5,687,609 A * | 11/1997 | Schmalzel | 73/322.5 |
| 5,700,904 A | 12/1997 | Baker et al. | 530/305 |
| 5,725,731 A | 3/1998 | Brungardt et al. | 162/72 |
| 5,756,622 A | 5/1998 | Wang et al. | 526/288 |
| 5,814,210 A | 9/1998 | Yoon et al. | 209/164 |
| 5,959,054 A | 9/1999 | Wang et al. | 526/288 |
| 6,121,398 A | 9/2000 | Wool et al. | 526/238.1 |
| 6,200,377 B1 | 3/2001 | Basilio et al. | |
| 6,320,148 B1 | 11/2001 | Yoon et al. | 209/127.3 |
| 6,375,853 B1 | 4/2002 | Yoon | 210/727 |
| 6,526,675 B1 | 3/2003 | Yoon | 34/424 |
| 6,666,952 B2 | 12/2003 | Dilts et al. | 162/158 |
| 6,799,682 B1 | 10/2004 | Yoon | 209/166 |
| 6,855,260 B1 | 2/2005 | Yoon | 210/727 |
| 6,871,743 B2 | 3/2005 | Yoon | 209/166 |
| 2005/0167340 A1 | 8/2005 | Yoon | |

FOREIGN PATENT DOCUMENTS

| | | |
|---|---|---|
| GB | 898213 | 6/1962 |
| GB | 2093735 | 9/1982 |
| GB | 2171336 A | 8/1986 |
| GB | 2212418 A | 7/1989 |
| GB | 2254021 A | 9/1992 |
| JP | 61025651 | 2/1986 |
| JP | 168991/89 | 7/1989 |
| JP | 168992/89 | 7/1989 |
| JP | 11349316 | 12/1999 |
| SU | 810286 | 3/1981 |
| SU | 822903 | 4/1981 |
| SU | 839575 | 6/1981 |
| SU | 1041156 | 9/1983 |
| SU | 1131540 | 12/1984 |
| WO | WO91/03599 A1 | 3/1991 |
| WO | WO97/25149 | 7/1997 |
| WO | WO00/09268 | 2/2000 |
| WO | WO01/87490 A1 | 11/2001 |
| ZA | 812122 | 3/1981 |
| ZA | 862192 | 3/1986 |

OTHER PUBLICATIONS

Davis, et al., "A New Sizing Agent for Paper—Alkylketene Dimers" TAPPI, Jan. 1956, vol. 39, No. 1 (2 pages).

Abstract and original article of: Borisov, et al., "Use of flotation during a determination of low diamond content in fine-grained titanium-zirconium placer deposits." Inst. Miner. Resur, (1970) 280-3 (5 pages).

Abstract only of: "Adsorption of inorganic depressants on synthesized diamond and graphite." 113(4), Grad. Sch. Eng., Kyoto University, (1997) 269-273 (1 page).

Abstract only of: "Flotation for removing impurities from synthesized diamond." 109(3), Fac. Eng., Kyoto University, (1993) 219-24 (1 page).

Attia, et al., Adsorption Thermodynamics of a Hydrophobic Polymeric Flocculant on Hydrophobic Polymeric Flocculant on Hydrophobic Colloidal Coal Particles. Langmuir, vol. 7, No. 10, pp. 2203-2206, 1991.

Skiles, Search for the Next Generation of Coal Flotation Collectors, pp. 189-203.

Aplan, How the Nature of Raw Coal Influences its Cleaning, Industrial Practice of Fine Coal Processing, pp. 99-111.

Yoon, Part 2: Advanced Coal Cleaning, Coal Preparation, pp. 966-1005.

Steedman, et al., Oil Agglomeration Process for the Treatment of Fine Coal, File Oil Processing, pp. 179-204.

Yoon, et al., Long-range Hydrophobic Forces Between Mica Surfaces in Docecylammonium Chloride Solutions in the Presence of Dodecanol, Journal of Colloid and Interface Science, vol. 179, pp. 391-402, 1996.

Mao, et al., Predicting Floation Rates Using a Rate Equation Derived from First Principles, International Journal of Mineral Processing, vol. 50, pp. 171-181, 1996.

Yoon, et al., Hydrophobic Forces in Thin Water Films Stabilized by Dodecylammonium Chloride, Journal of Colloid and Interface Science, vol. 211, pp. 1-10, 1999.

Yoon, et al., Long-range Hydrophobic Forces between Mica Surgaces in Alkaline Dodecylammonium Chloride Solutions, 1996, Journal of Colloid and Interfaces Science, vol. 179, pp. 403-411.

Jones, "Alkyd Resins" vol. A1, pp. 409-423.

Yoon, et al., Application of Extended DLVO Theory, IV Derivation of Flotation Rate Equation from First Principles, 1996, Journal of Colloid and Interface Science, vol. 181, pp. 613-626.

Yoon, et al., Hydrophobic Interactions Between Dissimilar Surfaces, 1997, Journal of Colloid and Interface Science, vol. 185, pp. 363-370.

Sanders, "The Role and Performance of Romjig in Modern Coal Preparation Practice" pp. 205.

Spanish translation of International Search Report dated Apr. 27, 2001 (7 pages).

Gray, et al., The Sizing of Paper, Surface Sizing pp. 257-286.

Rao, et al., Synthesis and Characterization of Diels—Alder Adducts from Linseed Oil Fatty Acids, Indian Journal of Chemistry, vol. 35B, Apr. 1996, pp. 365-368.

Solladie-Cavallo, et al., Linseed Oil and Mixture with Maleic Anhydride: H& [13] CNMR, Journal of American Oil Chemists' Society, vol. 80, No. 4, 2003, pp. 311-314.

Woo, et al., A Method to Elucidate the Structure of Maleinized Linseed Oil, J. Coating Technology, vol. 49, 1977, pp. 42-50.

Eren, et al., Polymerization of Maleic Anhydride—Modified Plant Oils with Polyols, Journal of Applied Polymer Science, vol. 90, 2003, pp. 197-202.

Cates, et al., Alkyl Ketene Dimer Sizes, Chapter 2, The Sizing of Paper, $2^{nd}$ Edition, W.F. Reynolds, Ed., Tappi Press, 1989, pp. 33-50.

Ulman's Encyclopedia of Industrial Chemistry, $5^{th}$ Edition, vol. A1, pp. 409-423, 1985.

Bulletin 21A, PQ Corporation.

Alekseev, English abstract and original article: Effect of pH on the Surface Condition of Diamonds in Extraction by Physicochemical Beneficiation Methods, Tsvetnye Metally (Moscow, Russian Federation), vol. 35, No. 6, 1962, pp. 76-78.

Alekseev, English abstract and original article: Effect of Sodium Silicate on Diamond Surface, Tsvetnye Metally, vol. 31, No. 10, 1961, pp. 80-81.

Bogatyreva, et al., English abstract and original article: Mechanism of Interaction of C7-8 Fatty Acids with the Surface of Synthetic Diamonds, Sin. Almazy, 1972, vol. 4, No. 6, pp. 39-42.

Chanturiya, et al., Surface Properties of Diamonds in Kimberlites Processing, Proceedings of the XXI International Mineral Processing Congress, 2000.

Wang, et al., Hydrophobic Forces in Foam Films Stabilized by Sodium Dodecyl Sulfate: Effect of Electrolyte, Langmuir, vol. 20, No. 26, 2004, pp. 11457-11464.

Chen, et al., Novel Technique for the Recovery of Fine Diamonds, Processing of Hydrophobic Mineral and Fine Coal, 1995, p. 459-466.

Reckling, et al., Diamonds Industrial, Industrial Minerals and Rocks, 6$^{th}$ Edition, Society of Mining, Metallurgy and Exploration, Inc., 1994, p. 653-676.

Ryaboi, et al., Increase of Diamond Recovery from Kimberlite Ores by Froth Separation with Flotation Reagents, Mekhanobr-Orgsintez-Reagent, Obogashchenie Rud (Sankt-Peterbury), 1998, pp. 24-27.

Sharpe, Inorganic Chemistry, 1986, p. 362.

Encyclopedia of Polymer Science & Technology, 1$^{st}$ Edition, vol. 11, pp. 61-69 & 128-139, 1988.

U.S. Appl. No. 09/368,945.

U.S. Appl. No. 09/326,330, filed Jun. 7, 1999 titled: Method of Using Natural Products as Dewatering Aids for Fine Particles.

U.S. Appl. No. 09/327,266, filed Jun. 7, 1999 titled: Method of Enhancing Fine Particle Dewatering.

U.S. Appl. No. 10/218,979.

U.S. Appl. No. 09/573,441, filed Oct. 5, 2000.

Russian Office Action dated Jan. 2, 2010 issued in related Russian Patent Application No. 2007133189.

African Office Action dated Mar. 25, 2011 issued in related African Patent Application No. AP/P/2007/004127.

\* cited by examiner

SEPARATION OF DIAMOND FROM GANGUE MINERALS

CROSS-REFERENCE TO RELATED APPLICATIONS

The present application claims the benefit of co-pending U.S. Provisional Application No. 60/649,952, filed Feb. 4, 2005.

TECHNICAL FIELD

The present application relates to a method of separating diamonds from gangue minerals.

BACKGROUND

Diamonds are formed under high pressure deep within the Earth's mantle, generally more than 150 km below the crust, and ascend to the surface when magma rises and erupts in small but violent volcanoes. The volcanic action creates carrot-shaped 'pipes' filled with volcanic rock forming diamond ore, such as kimberlite or lamproite. In addition, diamonds may be found in alluvial or marine terrace deposits. Kimberlite ores, for example, are ultrabasic and weather readily. In tropical climates, kimberlite weathers to 'yellow ground' which is predominantly comprised of clays. In temperate climates, weathering is less severe, but clays are still the predominant weathering product. The ore also includes gangue minerals, such as olivine (($Mg,Fe)_2SO_4$), garnet (($Fe,Al)(SiO_4)_3$), diopside (($Ca,Mg,Cr)SO_4$), magnesian ilmenite (($Fe,Mg)TiO_3$), enstatite (($Mg,Fe)_2Si_2O_6$), chromite (($Fe,Mg)O(Fe,Al,Cr)_2O_3$), phlogopite ($KMg_3AlSi_3O_8(F,OH)_2$), and serpentine ($Mg_6(OH)_8Si_4O_{10}$).

An exemplary method of processing fresh diamond ores begins with crushing. An ore may be crushed initially to about or below 250 mm by means of a gyratory crusher and then to about 75 mm using a cone crusher. Then another stage of crushing may be accomplished by means of a high-pressure roller mill to further reduce the size below 25 mm. The crushed ore may be scrubbed in a tumbler in the presence of water, and the fines generated during crushing and scrubbing may be removed by means of a screen that may have, for example, 2 mm apertures.

The crushed ore particles that are finer than 25 mm but larger than 2 mm may be sent to gravity separation devices such as jig or heavy medium cyclones to remove light minerals from heavies. The heavy minerals, which include diamond, may be sent to X-ray sorters that are designed to spot diamonds by fluorescence and then activate air jets that sweep diamonds from a belt into a collector. The reject from the X-ray sorters may be sent to greased tables (or belts), which are covered with thick layers of oily substances such as lubricating oils, paraffin oils and other materials where some of the diamonds may be retained.

Material finer than about 2 mm may be screened at about 0.5 mm, and the screen overflow, i.e., material between about −2+0.5 mm, may be subjected to flotation. In this process, it is contemplated that the particles may be suspended in water and air bubbles may be injected into the suspension. The air bubbles may pick up some of the diamonds selectively on the surface and the resulting bubble-particle aggregates rise to the surface of the water. As it is well known to those skilled in the art, flotation may be conducted with the addition of reagents such as frothers that may increase the abundance of gas bubbles or control gas bubble size distribution. It should be appreciated, however, that the ore sizes discussed above, are exemplary for the purposes of background discussion and should not be construed as limiting the processes discussed herein.

Without being bound to any particular theory, it is reported that the above described diamond separation processes, i.e. the greased tables and diamond flotation, function due to the principle of hydrophobic interaction. Hydrophobic interaction refers to the attraction between hydrophobic substances in water.

Comprised mainly of carbon atoms, diamond is relatively nonpolar and naturally hydrophobic. The diamonds may also have water contact angles of greater than about 60° as measured by the sessile drop technique, including all increments and values therein, such as 65°, 75°, etc. Accordingly, diamond crystals may stick to the grease on the greased table and to the air bubbles, as both the grease and the air bubbles are nonpolar and hydrophobic, allowing the separation of the diamonds from the hydrophilic gangue minerals during the processing of kimberlite and lamporite ores.

It has been reported that diamonds, such as, for example, alluvial diamonds, and particularly those from marine terraces, are frequently coated with films of mineral salts. The films may be formed by the adsorption of various ions such as $Fe^{3+}$, $Mg^{2+}$, silicate, carbonate, etc., on the surface of the diamond when, for example, the diamonds are placed in water that has contacted kimberlite ore or other ore material. This may cause the diamonds to become less hydrophobic and more water wettable (i.e., hydrophilic). Slime coatings may also occur upon the contact of diamonds with process water during industrial separation. Due to their mainly ionic composition, the slime coatings may also render the diamond surfaces less hydrophobic and more water wettable (i.e., hydrophilic). For example, the diamonds may have surface contact angles of less than about 60° after contacting ore slurry, including all ranges and increments therein such as 45°, 59°, etc., as measured by the sessile drop technique. These phenomena may be referred to as 'secondary hydrophilization'. Secondary hydrophilization may render the yield of diamond separation processes less than practically feasible.

DETAILED DESCRIPTION

The present invention relates to a method of separating diamonds from gangue minerals by using reagents and, in particular, by contacting the reagents with the diamond surfaces. In an exemplary aspect, the present invention may relate to reducing the effect of secondary hydrophilization that may be caused by hydrophilic coatings forming on diamond surfaces when, for example, the diamonds may be contacted with a slurry that may include, for example, natural water or process water. For the purpose of the present invention and as referred to herein, process water is defined as natural water that has been contacted with a diamond ore.

Reagents that may be suitable for the present invention may be generally divided into at least two functional classes. One functional class may be represented by water conditioners. The other class may be represented by hydrophobicity-enhancing reagents comprised of hydrophobic compounds as well as solvents and dispersion aids thereof. These reagents may enhance the hydrophobicity of diamonds or increase the hydrophobicity of diamonds that have become less hydrophobic due to secondary hydrophilization.

In an exemplary embodiment of the present invention, a diamond-containing ore, such as kimberlite or lamproite, or an alluvial ore may be contacted with a slurry which may be treated with a water conditioner and a hydrophobicity-enhancing reagent (collector). The water conditioner and hydrophobicity-enhancing reagent may be added to the slurry prior to contacting the slurry with the diamond ore or after contacting the slurry with the diamond ore. It should be appreciated that the water conditioner and hydrophobicity-enhancing reagent may be added to the slurry at the same time or separately. For example, the water conditioning agent may be added before adding the hydrophobicity-enhancing reagent or may be added after adding the hydrophobicity-enhancing reagent. In another exemplary embodiment of the present invention, the slurry may be treated directly with a hydrophobicity-enhancing reagent without the benefit of the water conditioner. Also, the slurry may be treated directly with the water conditioner without benefit of the hydrophobicity-enhancing reagent.

The water conditioners may constitute one of the functional classes suitable for the present invention. The conditioners may reduce the effects of secondary hydrophilization. These reagents may be substances incorporating polar or ionic fragments in their structure and may be added directly or indirectly to the slurry. It should be appreciated that these substances may not generally contribute to the hydrophobicity of diamond surface through adsorption.

Water conditioners may include but are not limited to the group of compounds that may be water soluble producing silicate, phosphate, polyphosphate, phosphonate, and polyacrylate anions upon contact with the diamond slurry or may be the anions themselves. The conditioners can be used to produce the anions of single type or any of their combinations.

Alkali metal silicates, such as sodium silicates of different $SiO_2/Na_2O$ ratios represent an exemplary embodiment of water conditioners contemplated herein. For example, sodium silicates of low $SiO_2/Na_2O$ ratios that can increase the pH of the ore slurry may be employed.

Silicate salts may increase the pH of the treatment environment above 10. However, if only silicates with high silicate to metal oxide ratios are available, one may increase the pH above 10 by separately adding a soluble metal oxide or hydroxide, such as sodium hydroxide or lime.

The silicate salts may be either hydrous or anhydrous and either a solution or dry powder. When using powdered reagents, the powdered reagents may be dissolved in water and aged for polymerization before use.

The amount of silicate salts which may reduce the effect of secondary hydrophilization depends on the slurry composition, and particularly, on factors such as water hardness and solids content. In general, the silicate water conditioners may be used in amounts to about 100 lb/ton or more, including all increments and ranges therebetween including 10 mg/l, 300 mg/l, 4000 mg/l, etc. In one embodiment the water conditioner may be utilized in the amount of about 300 mg/l or more, including all values and ranges therein.

The hydrophobicity-enhancing reagents may be comprised of hydrophobic compounds as well as solvents and dispersion aids thereof. The hydrophobic compounds may belong to the group of the hydrophobic monomers, oligomers, and polymers of natural or synthetic origin. The chemical structure of these compounds may generally be characterized by the prevalence of fragments that do not form hydrogen bonds with water molecules. Appropriate solvents and emulsifiers may be utilized to facilitate handling at operating temperatures and distribution of the hydrophobic compounds in the diamond ore slurry.

In an exemplary embodiment, the hydrophobic compounds may be produced by reacting together at least two of the following types of monomers to form a hydrophobic compound:
A1: Polybasic carboxylic acids, esters, and anhydrides
A2: Polyhydric alcohols or polyols
A3: Fatty acids or their alkyl esters and triglyceride oils of vegetable and animal origin
A4: C12-C24 olefins Polybasic acids may include carboxylic acids acid containing at least two replaceable hydrogen atoms per molecule. The polybasic acids and anhydrides (A1) may include, but are not limited to phthalic, isophthalic, trimellitic, adipic, azelaic, terephthalic, oxalic, malonic, maleic, succinic, glutaric, sebacic, or any mixtures thereof. The esters may be cyclic in nature and include β-propiolactone, β-methyl-β-propiolactone, δ-valerolactone, ε-caprolactone, glycolide, and lactide.

Polyhydric alcohols (A2) may include, but are not limited to, mono-, di-, and tri-glycerol, pentaerythritol, sorbitol, polyvinyl alcohol, alpha-methyl-O-glucoside and polyallyl alcohol. The polyols may be bifunctional glycols or poly (alkylene) glycols comprised of at least one unit selected from but not limited to the group of ethylene oxide, propylene oxide, butylene oxide, pentylene oxide, and hexylene oxide. Mixtures of polyhydric alcohols and polyols may also be utilized.

Fatty acids (A3) may include C8-C24 saturated and unsaturated fatty acids. The former may include myristic, lauric, stearic, palmitic acids and the likes, while the latter may include oleic, linoleic, linolenic, alpha-eleostearic, licanic, docosahexenoic, arachidic acids, and the likes. Any combination of the saturated and unsaturated monobasic acids listed above may be used. The fatty acids can also be used as their esters with C1-C4 alcohols, including but not limited to methyl ester or ethyl esters.

Triglyceride oils (A3) may include crude or processed oils of vegetable or animal origin including soybean oil, linseed oil, castor oil, dehydrated castor oil, corn oil, safflower oil, sunflower oil, canola oil, fish oils, lard oil, beef oil, oiticica oil, tung oil, and tall oil, or their combinations.

In an exemplary embodiment, the hydrophobic compound may be prepared as an alkyd resin, for example, by reacting glycerol as a polyhydric alcohol (A1), phthalic anhydride as a carboxylic acid anhydride (A2), and linseed oil (A3) according to a method well known to those skillful in alkyd synthesis. At a temperature above approximately 180° C., the linseed oil may react in the presence of a catalyst, such as lead, calcium and alkali metals in the form of oxides, hydroxides, or metallic soaps, with the glycerol to form monoglycerides, which in turn may react with phthalic anhydride to form an alkyd polymer of the following structure:

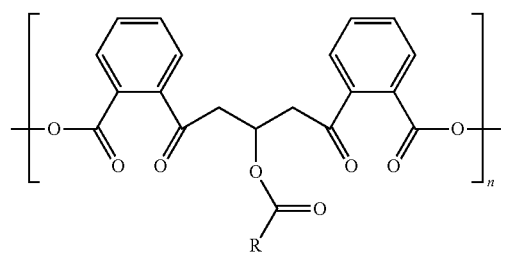

where R may represent a blend of unsaturated and saturated alkyl and alkyl-aryl hydrocarbon chains. The linseed oils may be triglycerides of about 10% saturated C16 and C18 fatty acids, about 22% oleic acid, about 17% linoleic acid, and about 50% linolenic acid.

Another exemplary embodiment of the present invention contemplates the use of hydrophobic compounds in the form of saturated and unsaturated polyester resins prepared by reacting polybasic acids or their anhydrides (A1) with polyhydric alcohols or polyols (A2) using the methods and reactants well known to those skilled in the art of polyester technology. In this case, the fatty acids or triglyceride oils of vegetable and animal origin (A3) may be used as optional diluent.

In yet another exemplary embodiment, the polybasic acids or their anhydrides species (A1) type, particularly those producing a maleic grouping, may be condensed through an "ene" reaction with unsaturated fatty acids or their alkyl esters, triglyceride oils of vegetable and animal origin (A3). Many compounds of type A1 yielding maleic anhydride and the like may be utilized in this reaction, such as malic acid, fumaric acid, maleic acid, aconitic acid or citric acid, if subjected to the conditions under which maleic anhydride is formed as well known to those skilled in the art.

Maleinization of unsaturated fatty acids, their esters or triglycerides is well known to those skilled in the art and may be recognized as forming a condensation product in the presence of heat and/or pressure. Depending on the number of moles of the anhydride reacted maleinization may proceed in several steps. The addition of the first mole of the anhydride may proceed through an "ene" reaction, which may result in the addition of a succinic anhydride group to the allylic position of the fatty chain. For the oils (and fatty acids) having more than one double bond in the fatty chains, such as linseed or soybean oil, the first step may be followed by rearrangement of the double bonds of the fatty chain into the conjugated system and addition of the second mole of the anhydride through Diels-Alder reaction.

Thus obtained reaction products may be further cross-linked to create higher molecular weight species also useful in the present invention. Cross-linking may be accomplished through the esterification of the anhydride functionalities with the polyhydric alcohols or polyols described as monomer A2. A direct cross-linking of triglyceride oils with maleic anhydride may also be contemplated. Additionally, elevated temperatures may also cause a direct thermal condensation between the fatty acid chains of triglyceride oils, which may further increase the molecular weight of the maleinized products.

Reacting the A1 acid anhydrides with unsaturated oils or fatty acids and further cross-linking with polyhydric alcohols may result in between about 50% and 90% of the material having an average molecular weight from 500 to 10,000 Daltons and from about 10% to 50% of the material with a molecular weight in the range from 10,000 to 100,000 Daltons as determined by gel permeation chromatography.

Hydrophobic compounds may also be produced by reaction the of anhydrides of unsaturated polycarboxylic acids (A1) with suitable olefins (A4). In an exemplary embodiment of the present invention, the products of the maleinization of C12-C24 olefins (A4) through "ene" reaction are as follows:

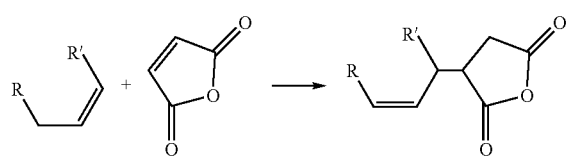

wherein an alkenyl succinic anhydride may be obtained. Here, R may be a dimethylene or trimethylene radical and R' may be a hydrophobic group containing more than 5 carbons. R' may also be a linear or branched alkyl, alkenyl, aralkyl, or aralkenyl group. Furthermore, R' may contain more than twelve carbon atoms.

Representative of thus obtained anhydrides are those exemplified in U.S. Pat. Nos. 3,102,064; 3,821,069 and 3,968,005, which include iso-octadecenyl succinic anhydride, n-hexadecenyl succinic anhydride, dodecenyl succinic anhydride, decenyl succinic anhydride, dodecyl succinic anhydride, octenyl succinic anhydride, triisobutenyl succinic anhydride, 1-octyl-2-decenyl succinic anhydride, 1-hexyl-2-decenyl succinic anhydride, etc. and mixtures thereof.

Linear internal olefins may have a double bond in the 1, 2, or 3 positions as well as at position four and inwards as described in U.S. Pat. No. 4,687,519, incorporated herein by reference and represented by the structure:

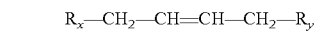

where $R_x$ may include an alkyl radical containing at least four carbon atoms and $R_y$ may be an alkyl radical containing at least four carbon atoms.

Branched olefins may be represented by vinylidene olefins corresponding to:

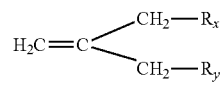

where $R_x$ and $R_y$ may include alkyl radicals containing at least 4 carbon atoms in each radical.

Reacting mixtures of saturated and unsaturated fatty acids (A3) to form beta-lactones (alkyl or alkenyl ketene dimers, AKD) may produce further hydrophobic compounds described by the general formula:

where R may be, a hydrophobic group containing more than about 4 carbon atoms and selected from alkyl, alkenyl, aralkyl or aralkenyl groups. R may also be a hydrophobic group containing from about 4 to 36 carbon atoms. Such hydrophobic compounds may include, but are not limited to, octyl ketene dimer, decyl ketene dimer, dodecyl ketene dimer, tetradecyl ketene dimer, hexadecyl ketene dimer, octadecyl ketene dimer, eicosyl ketene dimer, docosyl ketene dimer, tetracosyl ketene dimer, and those prepared by known methods from organic acids and naturally occurring mixtures of fatty acids such as those found in palmitoleic acid, oleic acid, rincinoleic acid, linoleic acid, linolenic acid, coconut oil, palm oil, olive oil, peanut oil and mixtures thereof. The alkyl, aralkyl or aralkenyl groups may include from about 8 to 36 carbon atoms. The agents may also include hexadecyl, octadecyl and oleyl ketene dimer.

Additionally, ketene multimers may also be contemplated as hydrophobic reagents. The multimers containing more than one b-lactone ring may be manufactured from the mixture of saturated and unsaturated carboxylic acids (A3) that additionally contains dimer acid or aliphatic dicarboxylic acid (A1), such as azelaic acid, succinic acid, glutaric acid (U.S. Pat. No. 5,725,731, the teaching of which is incorporated by reference herein).

Furthermore, reacting fatty acids or their alkyl esters (A3) with hydroxylamine to produce fatty hydroxamic acids may produce other hydrophobic compounds that may be employed in the present invention. These reaction products may be further derivatized to alkoxy or alkenoyl hydroxamic acids which may be comprised of a hydrophilic portion which may be an alkoyl or alkenoyl hydroxamic acid and a hydrophobic portion which may be a hydrocarbon group having at least 8 carbon atoms. The hydrophilic portion may be for example N-methylstearoylhydroxamic acid, stearoylhydroxamic acid, or oleoylhydroxamic acid.

Other processing methods of unsaturated fatty acids or their alkyl esters and triglyceride oils of vegetable and animal origin (A3) may be utilized to manufacture the hydrophobic compounds suitable for the present invention. These other methods include refining, heat polymerization, isomerization-conjugation, boiling, blowing, epoxidation, dehydration, copolymerization with ethylenic monomers selected but not limited to the group of acrylate, methacrylate, styrene, acrylamide, acrylonitrile, vinyl carboxylate esters and vinyl halides, mixtures thereof, and salts thereof. In an exemplary embodiment, the hydrophobic compounds may be the crude and refined oils available, for example, from Archer Daniels Midland Company, Decatur, Ill., USA; blown, heat polymerized in the absence of air, and boiled plant oils available, for example, from Cargill Inc., Minn., USA; epoxidized oils available, for example, under the tradename Vikoflex® from ATOFINA Chemicals, Inc., Pa., USA; dehydrated castor oil available, for example, under the tradename Castung from G. R. O'Shea Company, Ill., USA; acrylated soybean oil available, for example, from Sartomer Company, PA, USA.

In another exemplary embodiment of the present invention hydrophobic compounds may be selected from the group of polymethacrylate resins. Polymethacrylate may have the following structure:

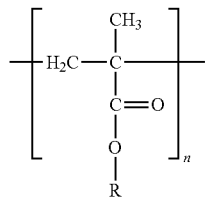

where R may be an alkyl, alkyl-aryl or alkene groups, with straight or branched chain structures. In one embodiment, hydrocarbon solutions of poly(2-ethylhexyl methacrylate) may be available from Nalco Company, Naperville, Ill., or Sigma Aldrich Chemical Company. The Nalco product referred to herein as PX-1 is a solution of 4.7% of poly(2-ethylhexyl methacrylate) in a complex solvent matrix comprised of 77.8% heavy aliphatic naphtha, 9.6% isopropyl alcohol, 3.7% ethylene glycol, and 2.6% anionic surfactant. The solution may also contain trace water and reaction byproducts. The Sigma product referred to herein as PX is a 33% solution of poly(2-ethylhexyl methacrylate) in toluene. These polymethacrylates may have an average molecular weight of between approximately 50,000 to 200,000 and all increments there between including 80,000 130,000, etc., as measured by gel permeation chromatography. It should also be appreciated that other polymethacrylate resins whose R is of longer or shorter chain than 2-ethylhexyl group may be used. The longer chain polymethacrylates may include, but are not limited to, poly(lauryl methacrylate), poly(hexadecyl methacrylate), poly(octadecyl methacrylate), poly(cyclohexyl methacrylate), and benzyl methacrylate, which may be blended with appropriate solvents and emulsifiers listed herein.

In an exemplary aspect of the present invention, the hydrophobic compounds may include water-soluble polymers that have been modified to add hydrophobic moieties, as with hydrophobically modified hydroxyethyl cellulose (HMHEC) or hydrophobically modified hydroxyethyl cellulose (HM-HPC). Modified water-soluble polymers may be obtained from Hercules, Inc., Wilmington, Del., under the trade name Aqualon. The hydrophobically modified polyethers may be utilized as hydrophobicizing agents. The hydrophobically modified polyethers may be obtained from Hercules under the trade name Aquaflow. Nonionic polymers with hydroxyethyl or hydroxypropyl groups and hydrophobic side chains may also be used as hydrophobicity-enhancing polymers. The following structure represents the basic unit of the cetyl-hydroxyethyl cellulose which is marketed as NATROSOL Plus by Hercules.

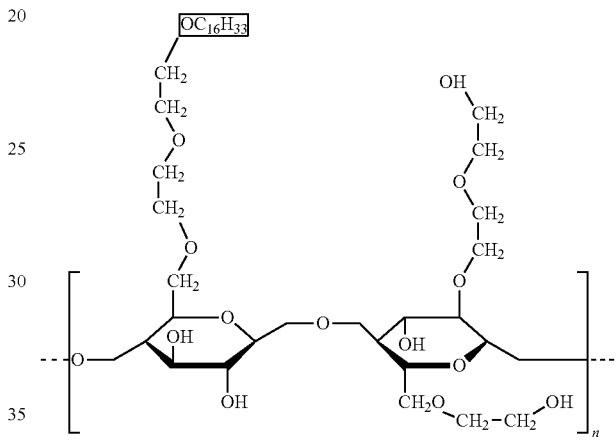

Other polymers may also be contemplated for use as the hydrophobic reagent herein including styrene maleic anhydride copolymers (SMA) which may be produced by the copolymerization of styrene with maleic anhydride. The polymers may have molecular weights in the range from about 10,000 to 300,000 (average by weight) and styrene to maleic anhydride ratios from about 1:1 to 3:1, and all increments therebetween. Styrene acrylic acid copolymers may also be employed and may be produced by the copolymerization of styrene with acrylic or methacrylic acid in various ratios. The copolymers may contain other hydrophobic monomers including methyl methacrylate, ethyl acrylate, or butyl acrylate.

Polyurethanes may also be employed as a hydrophobicity-enhancing agent herein. The polyurethanes may be straight-chained molecules that allow rotation of any ionic and/or hydrophobic groups optionally positioned on the polyurethane and may be synthesized by the condensation of toluene diisocyanate and dimethylol-propionic acid. An additional hydrophobic group may be included by replacing some of the dimethylol propionic acid with glycerol monostearate.

Furthermore, the hydrophobic compounds may be represented by hetero-polar collectors that may adsorb directly on the hydrophilic coatings formed on the surface of diamonds. The hetero-polar collectors may have a polar group that has an affinity toward the hydrophilic surface and non-polar group that renders the collector-coated surface hydrophobic. The hetero-polar collectors may include thiol-type collectors such as sodium dialkyl dithiophosphates and cresyl dithiophosphate.

Diluents may facilitate handling of hydrophobic compounds and their distribution in the diamond slurry. The diluents may include, but are not limited to, water or water miscible organic solvents such as short-chain aliphatic hydrocarbons, aromatic hydrocarbons, light hydrocarbon oils, glycols, glycol ethers, ketones, short chain alcohols, polyols, ethers, petroleum esters, petroleum distillates, naphtha, glycerols, chlorinated hydrocarbons, carbon tetrachloride, carbon disulfide, alcohols, carboxylic acids, esters of carboxylic acids, light hydrocarbon oils with carbon numbers of less than 10, or polar aprotic solvents such as dimethyl sulfoxide, dimethyl formamide, and N-methyl pyrrolidone.

The alcohol diluents may be a straight or branched alkyl group or phenyl group substituted by one or more hydroxyl groups. The diluents may include short chain alcohols. It should be appreciated that the alkyl group may be optionally interrupted by one or more oxygen atoms, provided that no two oxygen atoms are directly bonded to one another. Representative alcohol diluents include methanol, ethanol, propanol, butanol, phenol, ethylene glycol, propylene glycol, diethylene glycol, polypropylene glycol, glycerin, Dowfroth 250 (a polypropylene glycol available from Dow Chemical Company, Midland, Mich., USA), and similar materials.

Ketone diluents may be a water-soluble compound of formula $RC(O)R'$ where R and R' are alkyl groups. A representative ketone diluent includes acetone.

Carboxylic acid diluents may be a water-soluble compound of formula $RCO_2R''$ where R'' is H and R is an alkyl group. Representative carboxylic acid diluents may include formic acid, ethanoic acid, and the likes.

Carboxylic acid ester diluents or ester diluents may be a water-soluble compound of formula $R''CO_2R$ where R'' is H or an alkyl group. Representative ester diluents may include methyl acetate, ethyl acetate, ethyl lactate, and the likes.

The use of organic diluents may yield a hydrophobicity-enhancing reagent formulation with a substantially lower relative viscosity and increased stability over a wide range of temperatures. Glycols such as ethylene glycol, diethylene glycol, propylene glycol and glycerin may yield low viscosity promoter formulations at low dilution levels.

Silicone oil diluents may also be employed, and may include oligomers, polymers, copolymers, or mixtures thereof wherein each may comprise at least one recurring unit represented by the formula:

wherein R may be an alkyl, such as methyl, ethyl, propyl, and t-butyl, fluorinated alkyl, vinyl, phenyl, alkoxy and alkylamino, each of which may be substituted by a hydroxyl, such as hydroxymethyl, or by carboxyl, such as carboxypropyl, i.e., —$CH_2$—$CH_2$—$CH_2$—COOH. The silicone may be end capped with other moieties such as hydride or stearate. The silicone oil may further comprise polymeric side chains such as polyoxyethylene or polyethylene oxide or polyoxypropylene or polypropylene oxide.

The silicone oils may include but are not limited to the following poly(dimethylsiloxane), poly(diphenylsiloxane), poly(methylphenylsiloxane), poly(t-butyl-methylsiloxane), poly(dimethylsiloxane-co-alkylmethylsiloxane) where the alkyl may comprise, independently, from about 1 to about 18 carbon atoms, poly[dimethylsiloxane-co-3-(aminopropylmethylsiloxane)], hydrogen-terminated polysiloxanes such as hydride-terminated poly(dimethylsiloxane), stearate-terminated polysiloxanes such as distearate-terminated poly(dimethylsiloxane) and silicone oils such as poly(dimethylsiloxane) which may further comprise side chains selected from PEO, PPO, and mixtures thereof. The silicone oil may be a hydrophobic substance including but not limited to poly(methylphenylsiloxane), poly(dimethylsiloxane-co-alkylmethylsiloxane) where the alkyl may comprise, independently, from about 1 to about 18 carbon atoms, poly[dimethylsiloxane-co-3-(aminopropylmethylsiloxane)], and poly(dimethylsiloxane) which may further comprise side chains selected from polyethylene oxide, polypropylene oxide, and mixtures thereof.

In an exemplary embodiment one may disperse a hydrophobicity-enhancing reagent in a slurry so that one may more readily coat diamond surfaces and render the diamonds hydrophobic. Thus, the hydrophobic compounds with hydrolysable groups such as alkyd polymers, polyesters, and substituted cyclic dicarboxylic acid anhydrides may be made more dispersible through "salting" with a base, such as ammonia, amine, or alkali. This preparation may be made before the agents are introduced into the flotation system as well as during the flotation process, for example, by increasing the pH of the flotation slurry to higher than 7.

Distribution of the reagents within the flotation slurry may also be provided by using ionic and nonionic surfactants or mixtures of thereof. The ionic surfactants may include anionic, zwitterionic, and cationic surfactants. The surfactants may also be in the amount ranging from about 0.001 to 50 percent by weight and all increments there between, including 0.01 to 50 percent, 1-20 percent, 25-50 percent and etc. Alternatively, the weight percent of the surfactants may be between about 0.05 to 40 percent by weight.

Furthermore, distribution of the reagents within the flotation slurry may be provided by mechanical means such using conventional, high shear, or ultrasonic mixing.

Thus, according to one aspect, there may be provided a process for extracting diamonds comprising forming a slurry containing at least one diamond and at least one gangue mineral, wherein the at least one diamond includes a hydrophilic surface coating; adding a first reagent to the slurry, the first reagent at least partially removing the hydrophilic surface coating; and adding a hydrophobicity-enhancing reagent to the slurry, the hydrophobicity-enhancing reagent at least partially adsorbing on the at least one diamond.

According to another aspect, there may be provided a process for extricating diamonds comprising forming a slurry comprising at least one diamond and at least one gangue mineral, the at least one diamond including a surface coating; adding sodium silicate to the slurry, e.g. in an amount exceeding 300 mg/l; and adding a hydrophobicity-enhancing reagent to adsorb on the at least one diamond.

According to another aspect there may be provided a process for separating diamonds comprising forming a slurry containing at least one diamond and at least one gangue mineral, wherein the at least one diamond includes a surface coating; adding a hetero-polar collector; and adding a hydrophobicity-enhancing reagent.

According to another aspect, there may be provided a process for separating diamonds comprising supplying diamond ore comprising at least one diamond and at least one gangue mineral, the at least one diamond including a surface coating; and adding a hydrophobic polymer or oligomer to increase the hydrophobicity of the at least one diamond.

According to another aspect, there may be provided a process for separating diamonds comprising forming a slurry containing the at least one diamond and the at least one gangue mineral, wherein the at least one diamond includes a surface coating in the slurry; and adding an alkyd resin to increase the hydrophobicity of the at least one diamond.

According to another aspect, there may be provided a process for separating diamonds comprising forming a slurry containing at least one diamond and the at least one gangue mineral, wherein the at least one diamond includes a surface coating; adding a first reagent; and adding a second reagent to adsorb on the at least one diamond; wherein the second reagent is selected from the group consisting of an alkyl ketene formed into dimers, alkenyl ketene formed into dimers, styrene maleic anhydride copolymers, styrene acrylic acid copolymers, polyurethane dispersions, silicone oils, alkoxy hydroxamic acids, alkenoyl hydroxamic acids and combinations thereof.

According to another aspect, there may be provided a process for separating diamonds comprising forming a slurry containing at least one diamond and at least one gangue mineral, wherein the at least one diamond includes a surface coating; adding a first reagent; and adding a second reagent to adsorb on the at least one diamond; wherein the second reagent is produced by reacting a polybasic acid anhydride and an unsaturated monomer.

Test Procedure

Hydrophobicity-enhancing reagents disclosed herein were tested using two different types of flotation devices, i.e., a 1-inch diameter microflotation cell and a 4-inch diameter Hydrofloat flotation column. The latter was a flotation machine developed by Eriez Magnetics specifically for coarse particle flotation. In all of the tests, natural diamond crystals of −2+0.5 mm fraction were used. They were received dry, most of which were sufficiently hydrophobic so that they were readily floatable in tap water using hydrocarbon oils as collectors. It was found, however, that flotation was suppressed when diamonds were contacted with kimberlite ore slurry or with plant water due to the secondary hydrophilization, as discussed in the foregoing sections.

For each of the microflotation tests, 2 to 5 pieces of diamond were added to 20 grams of kimberlite ore and 20 grams of tap water in a glass vial and agitated for 3 to 15 minutes either by shaking by hand or tumbling along its longitudinal axis at a low rotational speed. In some cases, the vials were left to stand for overnight or for several days to ensure that the hydrophobicity of diamonds was dampened. In general, the longer the diamonds were in contact with ore slurry or with process water, the more difficult it was to float them.

After the diamonds had become relatively hydrophilic as a result of the procedure described above, a water conditioning agent was added to the glass vial, which was subsequently agitated for 3 to 10 minutes to remove the hydrophilic coatings from the surface of the diamonds. The vial was agitated again for 3 to 5 minutes after adding a hydrophobicity-enhancing reagent.

After conditioning, the diamonds were separated from the gangue minerals using a pair of forceps and placed in the microflotation cell that contained process water. The bottom of the flotation cell was made of medium-porosity glass frit, through which compressed air was passed to generate air bubbles. Depending on the extent at which the bubbles pick up the diamonds, the results of the flotation tests were classified into i) very strong, ii) strong, iii) weak, and iv) no attachment. The very strong refers to the case of 3 or 4 air (or nitrogen) bubbles adhering onto each diamond and causing them to rise very close to the air/water interface. The strong refers to the case of 2 to 3 bubbles adhering to each diamond and causing them to bounce near the bottom of the flotation cell. The weak refers to the case of only 1 to 2 bubbles attaching to each diamond tenuously and the diamond staying near the bottom. The no attachment refers to the case of diamond staying standstill on the glass frit with no bubbles attached on the surface.

For each of the 4-inch diameter Hydrofloat column tests, 10 pieces of diamonds were added to a plastic bottle containing 500 grams of kimberlite ore slurry and 500 ml of plant water. The bottle was subjected to hand shaking for 5 to 10 minutes to render the diamonds hydrophilic via secondary hydrophilization. A measured volume of a water-conditioning agent solution was added to the bottle, which was then agitated again for 5 to 10 minutes. The slurry was agitated again for another 5 to 10 minutes after adding a hydrophobicity-enhancing reagent. The conditioned slurry was fed slowly to a 4-inch diameter Hydrofloat column cell to see if the diamonds were floating selectively. The number of diamonds recovered by flotation was counted to determine the recovery.

In most tests, water-conditioning agents were added to slurry prior to hydrophobicity-enhancing reagents. In some tests, however, both were added together to obtain similar results.

EXAMPLES

The following examples are offered to aid in understanding the present invention and are not to be construed as limiting the scope thereof.

Example 1

Approximately 100 pieces of diamond crystals of 2×0.5 mm in size were received dry in a glass vial. Three of the larger crystals were removed using a pair of forceps and subjected to contact angle measurements and microflotation tests in tap water. The contact angles, $\theta$, measured using the sessile drop technique were in the range of 68 to 76°, and the microflotation tests exhibited strong bubble-particle attachments, as shown in Table 1. These results indicate that diamond is relatively hydrophobic.

When the dry, hydrophobic diamonds were placed in kimberlite ore slurries, contact angles were reduced to the range of 57 and 59° after 5 minutes of contact time and further to the range of 47 to 53° after 15 minutes of contact time. Also, the microflotation tests showed either weak or no attachment. The same was observed when diamonds were immersed in process water containing no visible signs of suspended particles.

TABLE 1

| Treatment | Diamond 1 | | Diamond 2 | | Diamond 3 | |
| --- | --- | --- | --- | --- | --- | --- |
| | $\theta$ | Air Bubble Attachment | $\theta$ | Air Bubble Attachment | $\theta$ | Air Bubble Attachment |
| Diamond, as received | 68 | Strong | 76 | Strong | 69 | Strong |
| After contact with the slurry for 5 min. | 59 | Weak | 58 | Weak | 57 | No |

TABLE 1-continued

|  | Diamond 1 | | Diamond 2 | | Diamond 3 | |
|---|---|---|---|---|---|---|
| Treatment | θ | Air Bubble Attachment | θ | Air Bubble Attachment | θ | Air Bubble Attachment |
| After contact with the slurry for 15 min. | 53 | Weak | 55 | Weak | 47 | No |
| After contact with the slurry for 10 minutes and then conditioned with 3.75 lb/ton of cresyl dithiophosphate (Aerofloat) and 4 lbs/ton PX for 3 min. | 75 | Very strong | 78 | Very Strong | 75 | Strong |

It was found that the effect of the secondary hydrophilization may be reduced by treating a kimberlite ore with a thiol-type collector, followed by treatment with a hydrophobic polymer. In this example, 3.75 lb/ton of cresyl dithiophosphate was used as a thiol-type collector and 4 lb/ton of poly (2-ethylhexyl)methacrylate, denoted as PX, was used as hydrophobicity-enhancing reagent. The latter was used as a 33.3% solution in mineral oil. The reagent dosages include the solvent. After 10 minutes of contact time, the water contact angles of the diamonds were increased to 75 to 78°, and the microflotation tests exhibited strong bubble-particle attachment.

Example 2

A diamond sample that had become hydrophilic due to secondary hydrophilization was treated with i) a thiol-type collector (sodium diisobutyl dithiophosphate; Aero 407) alone, ii) a hydrophobic polymer (PX) alone, and iii) a combination thereof. Thiol-type collectors may react chemically with heavy metals; therefore, they may be able to adsorb directly on the hydrophilic surface coatings containing metallic elements and render the surface hydrophobic. However, the diamonds treated with Aero 407 alone were not hydrophobic enough for air bubble attachment, as shown in Table 2. On the other hand, the diamonds treated with PX alone exhibited strong bubble-particle attachment, indicating that the hydrophobic polymer may be a stronger hydrophobicity-enhancing reagent than the thiol-type collector. When the diamond was treated with Aero 407 and PX, very strong bubble-particle attachment was observed. Note that the use of the thiol-type collector may reduce the PX dosage required for strong bubble-particle attachment. In this example, the PX was used as a 1:2 blend with mineral oil. The results given in Table 2 show that hydrophobicity-enhancing reagents tested in this example are selective for diamond flotation.

TABLE 2

| Aero-407 | PX and Mineral Oil Blend (1:2) | Air Bubble Attachment | |
|---|---|---|---|
| (lbs/ton) | (lbs/ton)* | Diamond | Gangue |
| 3.75 | — | No | No |
| 6.0 | — | No | No |
| 9.0 | — | No | No |
| — | 1.5 | Very Weak | No |
| — | 2.25 | Strong | No |
| — | 3.75 | Strong | No |
| 0.75 | 0.75 | Strong | No |
| 1.5 | 1.5 | Very strong | No |
| 3.75 | 3.75 | Very strong | No |

*includes diluent.

Example 3

Reagent PX-1 was a hydrophobic polymer (poly(2-ethylhexyl)methacrylate) blended mainly with kerosene as a diluent. It was too viscous to be used directly as a collector; therefore, the reagent was used after diluting it further with various solvents such as diesel oil, turpentine, mineral oil, pine oil, and paraffin oil. The ratio between the PX-1 and the secondary diluent was 1:2. The microflotation test results given in Table 3 exhibited very strong bubble-particle attachment when using paraffin oil, mineral oil, and diesel oil as diluents. With turpentine and pine oil, very strong adhesions were observed at higher PX-1 dosages.

TABLE 3

| Solvent | Dosage (lbs/ton) | Air Bubble Attachment | |
|---|---|---|---|
|  |  | Diamond | Gangue |
| PX-1 in Diesel (1:2) | 1.5 | weak | No |
|  | 3.0 | very strong | No |
|  | 4.5 | very strong | No |
|  | 7.5 | very strong | No |
|  | 12.0 | very strong | No |
| PX-1 in Turpentine (1:2) | 1.5 | No | No |
|  | 3.0 | very weak | No |
|  | 4.5 | No | No |
|  | 7.5 | Very strong | No |
|  | 12.0 | Very strong | No |
| PX-1 in Mineral Oil (1:2) | 1.5 | Weak | No |
|  | 3.0 | very strong | No |
|  | 4.5 | very strong | No |
|  | 7.5 | very strong | No |
| PX-1 in Pine Oil (1:2) | 1.5 | No | No |
|  | 4.5 | No | No |
|  | 9.0 | No | No |
|  | 13.5 | very strong | No |
| PX-1 in Paraffin Oil (1:2) | 1.5 | very strong | No |
|  | 3.0 | very strong | No |
|  | 4.5 | very strong | No |
|  | 7.5 | very strong | No |

A series of microflotation tests were also conducted by changing the PX-1-to-secondary diluent ratios. It was possible to achieve very strong flotation at 1.5 lb/ton of the 1:9 blend with paraffin oil. However, the reagent blends obtained with a higher proportion of PX-1 gave stronger bubble-particle attachment.

Example 4

In this example, PX-1 was emulsified using Tergitol NP-6, whose HLB number was 12.9. Table 4 shows the results obtained with two different compositions of PX-1 emulsions. One was prepared with 50 ml of PX-1, 25 ml of water, and 1 part of Tergitol NP-6 in 50,000 parts of the hydrophobic polymer. The other was prepared with 25 ml of PX-1, 25 ml of paraffin oil, 25 ml of water, and 1 part of Tergitol NP-6 in 25,000 parts of PX-1. The reagent dosages given in the table are for the emulsion, including PX-1, diluent and water. Very strong bubble particle attachments were observed at low reagent dosages. Once the diamond had become relatively hydrophobic, it remained floatable even after aging it in kimberlite slurry for overnight, which is unlike the observations made with untreated diamonds.

TABLE 4

| Composition of PX-1 Emulsions | Aging Time After Reagentizing | Dosage (lbs/ton) | Air Bubble Attachment |
|---|---|---|---|
| 0.1 ml 1% NP-6 in water | 15 min. | 4.5 | Weak |
|  |  | 7.5 | Strong |
| 50 ml PX-1 | Overnight | 3.0 | Very Strong |
| 25 ml water (1:50,000) |  | 6.0 | Very Strong |
| 0.1 ml 1% NP-6 in water 25 ml PX-1 25 ml paraffin oil 25 ml water (1:25,000) | 15 min. | 1.5 | Weak |
|  |  | 3.0 | Very strong |
|  |  | 4.5 | Very strong |
|  |  | 7.5 | Very strong |
|  | Overnight | 1.5 | Very Weak |
|  |  | 7.5 | Strong |
|  |  | 12.0 | Very Strong |

Example 5

A series of microflotation tests were conducted using actual plant water, which contained various dissolved species that were known to produce hydrophilic coatings on diamonds. For each test, 20 g of kimberlite ore, 20 g of plant water, and 3 pieces of diamonds were added to a glass vial. The mixture was agitated by hand shaking the vial for 5 minutes, and was left to stand overnight to allow secondary hydrophilization to take effect. The ore slurry contained considerable amounts of slimes that were present in the plant water and those formed during the 5-minute agitation time. After the overnight contact time, the supernatant solution was removed by decantation, and was replaced with approximately the same volume of the plant water that had been treated with a water-conditioning agent.

After 3 minutes of contact time between the ore and the treated plant water, a PX-1 emulsion was added to enhance the hydrophobicity of the diamonds. The three pieces of diamonds were then carefully removed and subjected to a microflotation test in the same manner as described for other examples. In control tests, the hydrophobicizing agent was added directly to the kimberlite ore slurry without a water-conditioning agent. In this example, the PX-1 emulsion was prepared by mixing 2 parts of PX-1 with 1 part of water. The mixture was made stable and water dispersible by adding 1 part of Tergitol NP-6 to 25,000 parts of PX-1 by volume. The results of the microflotation tests are given in Table 5, in which reagent dosages are given on the basis of the total weight of the emulsion including water.

TABLE 5

| Test No. | Treatment | PX-1 Emulsion (lbs/ton) | Desliming | Air Bubble Attachment |
|---|---|---|---|---|
| 1 | Control test with no water conditioner without desliming and decantation | 7.5 | No | No |
| 2 | Control test with no water conditioner with desliming and decantation | 7.5 | Yes | No |
| 3 | Deslimed, re-filled with lime-treated plant water (pH = 12) before adding PX-1 emulsion | 7.5 | Yes | Strong |
| 4 | Deslimed, refilled with sodium silicate-treated plant water (pH = 11) before adding PX-1 emulsion | 7.5 | Yes | Extremely Strong |
| 5 | Decanted, re-filled with sodium silicate-treated plant water (pH = 11) before adding collector | 7.5 | No | Extremely Strong |
| 6 | Decanted, refilled with sodium silicate-treated plant water (pH = 11) before adding collector | 4.5 | No | Extremely Strong |
| 7 | Decanted, re-filled with sodium silicate-treated plant water (pH = 11) before adding collector | 1.5 | No | Extremely Strong |

Tests 1 and 2 represent control tests conducted with 7.5 lb/ton of the PX-1 emulsion without water conditioner. Regardless of desliming, the microflotation tests exhibited no bubble-particle attachment. In Test 3, the plant water was treated with lime before adding the same amount of the hydrophobicizing agent. The flotation tests exhibited strong bubble-particle adhesion.

In Tests 4 and 5, the plant water was treated with sodium silicate before conditioning the slurry with PX-1. The results showed extremely strong bubble-particle attachment both in the presence and absence of slimes. Extremely strong bubble-particle attachment was observed at 4.5 and 1.5 lb/ton emulsion additions in Tests 6 and 7, respectively. The sodium silicate used in this example was a 38% w/v solution and its $SiO_2/Na_2O$ ratio was 2.5.

The results given in Table 5 show that sodium silicate was more effective than the lime treatment in overcoming the harmful effect of the secondary hydrophilization.

Example 6

A series of microflotation tests were conducted following the same procedure as in Example 5, except that the plant water was treated using different amounts of sodium silicate. In each test, 3 diamonds were placed in a vial containing 20 g of kimberlite ore and 20 g of plant water overnight to affect the secondary hydrophilization. The supernatant water was decanted off, and was replaced by the plant water that had been treated with varying amounts of sodium silicate. The ore slurry containing the seed diamonds was brought to contact with the treated water for 1 hour before conditioning it with a PX-1 emulsion for 3 minutes. The emulsion composition was the same as in Example 5. The test results given in Table 6 show there was no flotation until sodium silicate dosage was increased to 9 lb/ton of kimberlite ore, which was equivalent to 4,086 mg/l at 50% solids.

In this example, a sodium silicate solution with a $SiO_2/Na_2O$ ratio of 2.5 was used. Sodium silicate increased the pH with an increase in dosage as shown in Table 6. It was found that sodium silicate worked best at pHs of approximately 10 or higher.

TABLE 6

| Sodium Silicate Dosage (lbs/ton) | pH | Emulsion Dosage (lbs/ton) | Air Bubble Attachment |
|---|---|---|---|
| 0.6 | 8.95 | 7.5 | No |
| 1.5 | 9.05 | 7.5 | No |
| 3.0 | 9.25 | 4.5 | No |
| 6.0 | 9.6 | 4.5 | No |
| 9.0 | 9.90 | 4.5 | Very Strong |
| 15.0 | 10.30 | 4.5 | Extremely Strong |
| 30.0 | 10.80 | 4.5 | Extremely Strong |
| 60 | 11.25 | 4.5 | Extremely Strong |

Example 7

Microflotation tests were conducted on diamond crystals that had been in contact with a kimberlite ore for 3 days rather than overnight. The rest of the procedure was the same as in Examples 5 and 6 except that sodium silicate (38% w/v solution with a $SiO_2/Na_2O$ ratio of 2.5) was added directly to the kimberlite slurry containing diamonds. In the previous examples, process water was treated with sodium silicate before contacting the diamonds that had been contacted with kimberlite ore slurry.

After the sodium silicate addition, the ore slurry was agitated for 5 minutes by hand shaking the vial. Also, the PX-1 polymer was blended with a hydrocarbon oil (Nalco R-1121) at a 1:3 ratio before use. The test results obtained by varying the collector and sodium silicate dosages are given in Table 7. As shown, the dosages of the hydrophobicizing agents required to obtain strong bubble-particle attachment was reduced by increasing the dosages of sodium silicate.

TABLE 7

| Dosage of 1:3 Blend of PX-1 and R-1121 | 38% Sodium Silicate Solution Dosage (lbs/ton) | | | |
|---|---|---|---|---|
| (lbs/ton) | 15 | 22.5 | 30 | 37.5 |
| 1.5 | — | No | Very Weak | Very Weak |
| 3.0 | No | Strong | Very Strong | Very Strong |
| 4.5 | Very Weak | Very Strong | Extremely Strong | Extremely Strong |
| 7.5 | Very Strong | Extremely Strong | Extremely Strong | Extremely Strong |
| 10.5 | Extremely Strong | — | — | — |

Example 8

In this example, a sodium polyphosphate from Fisher Scientific was used as water conditioning agent for diamond flotation. A series of microflotation tests were conducted without desliming, and the results are given in Table 8. At 4.5 lb/ton of a PX-1 blend, it was possible to render the diamond floatable at 6 lb/ton of sodium polyphosphate on dry basis. The PX-1 blend was a 1:3 mixture of PX-1 and a hydrocarbon oil as in Example 7.

TABLE 8

| No. | Phosphate in Plant Water (wt. %) | pH | Phosphate (lbs/ton) | PX-1 Blend (lbs/ton) | Air Bubble Attachment |
|---|---|---|---|---|---|
| 1 | 0.50% | 6.87 | 10.0 | 4.5 | Extremely Strong |
| 2 | 0.30% | 6.71 | 6.0 | 4.5 | Very Strong |
| 3 | 0.20% | 6.71 | 4.0 | 4.5 | Very Weak |
| 4 | 0.10% | 6.48 | 2.0 | 4.5 | No |
| 5 | 0.05% | 6.28 | 1.0 | 7.5 | No |
| 6 | 0.02% | 6.24 | 0.4 | 7.5 | No |

Example 9

Table 9 shows the results of using polyacrylate as a water-conditioning agent without desliming. The reagent used in this example was a sodium polyacrylate from Nalco with an average molecular weight in the range of 8,000 to 12,000. All of the tests were conducted using 4.5 lbs/ton of 1:3 PX-1 and Nalco R-1121 blend. As shown, strong bubble-particle attachment was observed at sodium polyacrylate dosages of 7.5 lbs/ton and above.

TABLE 9

| Test No. | PX-1 Emulsion (lbs/ton) | Polyacrylate (lbs/ton) | Air Bubble Attachment |
|---|---|---|---|
| 1 | 4.5 | 15 | Very Strong |
| 2 | 4.5 | 11 | Strong |
| 3 | 4.5 | 7.5 | Strong |
| 4 | 4.5 | 3.8 | No |

Example 10

In the examples presented hitherto, a sodium silicate solution with a $SiO_2/Na_2O$ ratio of 2.5 was used as water conditioning agent. In this example, sodium silicate powders of $SiO_2/Na_2O$ ratios ranging from 2 to 3.2 were tested. Before use, they were dissolved in water at 38% w/v and then aged overnight for polymerization. A 1:1 blend of PX-1 and a paraffin oil with a Saybolt viscosity of 130 was used at a 5 lbs/ton dosage. The results of the microflotation tests, given in Table 10, show that silicate powders of higher $SiO_2/Na_2O$ ratios worked better as long as the pH of the kimberlite slurry was close to 10 or higher.

TABLE 10

| $SiO_2/Na_2O$ Ratio of Silicate Powder | Dosage (lbs/t) | pH | Strength of Diamond-Air Bubble Attachment |
|---|---|---|---|
| 2 | 3 | 9.42 | None |
| | 5 | 9.59 | None |
| | 10 | 9.86 | Weak |

TABLE 10-continued

| SiO$_2$/Na$_2$O Ratio of Silicate Powder | Dosage (lbs/t) | pH | Strength of Diamond-Air Bubble Attachment |
|---|---|---|---|
|  | 15 | 10.22 | Strong |
|  | 20 | 10.82 | Very Strong |
| 2.4 | 3 | 9.29 | None |
|  | 5 | 9.63 | Weak |
|  | 10 | 9.93 | Strong |
|  | 15 | 10.08 | Very Strong |
|  | 20 | 10.40 | Very Strong |
| 3.22 | 3 | 9.68 | Weak |
|  | 5 | 9.80 | Strong |
|  | 10 | 10.05 | Very Strong |
|  | 15 | 10.29 | Very Strong |
|  | 20 | 10.60 | Very Strong |

Example 11

In this example, various reagent formulations were evaluated as hydrophobicity-enhancing reagents by conducting microflotation tests. In each test, 5 diamonds sized in the range from 0.5 to 2 mm were contacted with kimberlite ore slurry overnight to render them hydrophilic via secondary hydrophilization. Before the test, the slurry was shaken to re-suspend the slimes in water. Then, the water with the slimes was decanted and replaced with clear process water, otherwise described as desliming as discussed herein. Following the desliming, the slurry was conditioned with 20 lb/t of sodium silicate solution (38% w/v) and 5 lbs/t of a hydrophobicity-enhancing for 3 minutes. The rest of the procedure was the same as in other examples, except that the results of the flotation tests were represented differently to average the results of the multiple runs.

Table 11 compares the performance of the 12 different formulations tested for the microflotation tests. The product termed linseed oil polymer with maleic anhydride and pentaerythritol was prepared by heat polymerizing linseed oil in presence of maleic anhydride under oxygen deficient conditions with further cross-linking using pentaerythritol. However, cross-linking using pentaerythritol may be optional. Oxygen deficient conditions refers to a condition wherein oxygen is present at less than about 20% of the environment in which the polymerization occurs, including all values and ranges therein, e.g. 10%, 5%, etc. The particles exhibiting very strong, strong, weak, and no bubble-particle attachments were given arbitrary scores of 20%, 13.33%, 6.67%, and 0%, respectively. Thus, if all five diamonds showed strong attachments, the performance was 100%.

TABLE 11

| Collector | Performance % |
|---|---|
| 80% linseed oil polymer with maleic anhydride and pentaerythritol blended with 20% C16-C24 fatty acid methyl ester | 100 |
| Linseed oil polymer with maleic anhydride and pentaerythritol | 100 |
| 95% C16-C18 alkenyl succinic anhydride, 1.25% di(2-ethylhexyl) sodium sulfosuccinate, and 3.75% hydrotreated light petroleum distillate and C15-C20 alkenes | 93 |
| Heat polymerized linseed oil | 80 |
| Soybean oil methyl esters | 58 |
| Glycerol propoxylate (96% propylene oxide) | 53 |
| Linseed oil polymer with pentaerythritol and phthalic anhydride | 49 |
| Regular blown soybean oil, with 3500 cPs viscosity | 13 |
| Polypropylene glycol oleate (76% propylene oxide), MW about 2000 | 13 |
| C12-14 linear alcohol ethoxylated with 1 mole ethylene oxide | 3 |
| Ethoxylated castor oil, 5 moles EO | 0 |
| Refined bleached soybean oil | 0 |

Example 12

In this example, the hydrophobicizing agent was prepared from a product obtained by heat polymerizing linseed oil in presence of maleic anhydride under oxygen deficient conditions with further cross-linking using pentaerythritol. Once again, crosslinking with the pentaerythritol may be optional and oxygen deficient conditions refers to a condition wherein oxygen is present at less than about 20% of the environment in which the polymerization occurs, including all values and ranges therein, e.g. 10%, 5%, etc. The agent was formulated as a 60% solution of the product in C16-C24 fatty acid methyl ester (FAME). The reagent conditioning and flotation procedures were the same as in Example 11.

Table 12 shows the results of the microflotation tests conducted using the above hydrophobicizing agent. Also shown for comparison are the results obtained using a hydrocarbon solution of poly (2-ethylhexyl methacrylate), which was a 1:1 blend between PX-1 and the paraffin oil with 130 Saybolt viscosity. All of the tests were conducted using 20 lb/t of sodium silicate solution (38% w/v solution) and 5 lb/t of hydrophobicity-enhancing reagent. As shown, the hydrocarbon solution of the linseed oil polymer with maleic anhydride and pentaerythritol gave considerably better results than the hydrocarbon solution of poly (2-ethylhexyl methacrylate).

TABLE 12

| Dosage (lbs/t) | 0 | 3 | 5 | 8 |
|---|---|---|---|---|
| Hydrocarbon solution of poly (2-ethylhexyl methacrylate), Performance % | 0 | 12 | 77 | 79 |
| Hydrocarbon solution of a linseed oil polymer with maleic anhydride and pentaerythritol, Performance % | 0 | 44 | 99 | 96 |

Example 13

In this example, 10 diamonds were added to a plastic bottle containing 500 g of de-slimed kimberlite ore and 500 ml of plant water. The slurry was agitated by hand shaking for 10 minutes to allow for hydrophilic coatings to form on diamond surface. A sodium silicate solution (35%) was then added as a water conditioner to clean the surface of the hydrophilic coatings and a hydrophobicizing agent was added to enhance the hydrophobicity or render the diamond surface hydrophobic. These reagents were added sequentially or together, after which the slurry was agitated for 10 minutes for conditioning. The conditioned slurry was fed to a 4-inch diameter Hydrofloat column cell to float the diamonds. The results are given in Table 13. The flotation was selective with very little gangue minerals floating with the diamonds. The test that gave the 90% recovery was conducted when the process water contained an exceedingly large amount of slimes.

TABLE 13

| Hydrophobicizing Agent | | 35% Sodium Silicate | |
|---|---|---|---|
| Composition | Dosage (lb/ton) | Solution (lb/ton) | Recovery (%) |
| 25% PX-1 in hydrocarbon oil | 8 | 0 | 0 |
| | 8 | 30 | 100 |
| | 14 | 20 | 100 |
| | 12 | 40 | 100 |
| 50% PX-1 in hydrocarbon oil and Tergitol NP-6 | 12 | 40 | 90 |

The foregoing description is provided to illustrate and explain the present invention. However, the description hereinabove should not be considered to limit the scope of the invention set forth in the claims appended hereto.

What is claimed is:

1. A process for separating diamonds from a slurry, wherein said diamonds include films of mineral salts causing secondary hydrophilization, comprising:
    adding sodium silicate, wherein said sodium silicate is added in an amount of 300 mg/l or greater, thereby reducing the effects of said secondary hydrophilization on the surface of said diamonds in said slurry thereby increasing the hydrophobicity of said diamonds;
    adding at least one hydrophobic hydrophobicity-enhancing reagent to said slurry, said hydrophobicity-enhancing reagent at least partially absorbing on said diamonds in said slurry and further increasing the hydrophobicity of said diamonds; and
    introducing air bubbles to said slurry so that said diamonds with increased hydrophobicity attach to said air bubbles and are separated from said slurry.

2. The process of claim 1 further comprising adding alkali to said slurry to raise the pH of said slurry to above 10.

3. The process of claim 1, wherein said hydrophobicity-enhancing reagent comprises a hydrophobic polymer or oligomer.

4. The process of claim 3 wherein said hydrophobic polymer or oligomer is prepared by reacting at least two monomers selected from the group consisting of polybasic carboxylic acids, esters and anhydrides; polyhydric alcohols and polyols; fatty acids and alkyl and triglyceride esters thereof; and $C_{12}$-$C_{24}$ olefins.

5. The process of claim 1 wherein said hydrophobicity-enhancing reagent is selected from the group consisting of alkyd resins, saturated and unsaturated polyester resins; maleinized unsaturated fatty acids and esters and triglycerides thereof; alkyl succinic anhydrides; alkyl and alkenyl ketene dimers; fatty hydroxamic acids; alkoxy hydroxamic acids, alkenoyl hydroxamic acids; polymethacrylate resins; styrene maleic anhydride copolymers; styrene acrylic acid copolymers; polyurethane dispersions; silicone oils; hydrophobically-modified water soluble polymers; and combinations thereof.

6. The process of claim 1 further comprising adding one or more diluents comprising water miscible organic solvents to said hydrophobicity-enhancing reagent.

7. The process of claim 1 further comprising adding one or more dispersion aids to said slurry.

8. A process according to claim 1 wherein said slurry comprises at least one gangue mineral and said diamonds include a surface coating, further comprising adding sodium silicate.

9. The process according to claim 1 wherein said slurry comprises at least one gangue mineral, further comprising adding a hetero-polar collector and said hydrophobicity-enhancing reagent to said slurry.

10. The process according to claim 1 wherein said slurry comprises at least one gangue mineral, further comprising adding an alkyd resin to said slurry.

11. The process according to claim 1 wherein said hydrophobicity-enhancing reagent is selected from the group consisting of alkyl ketene dimers, alkenyl ketene dimers, styrene maleic anhydride copolymers, styrene acrylic acid copolymers, polyurethane dispersions, silicone oils, alkoxy hydroxamic acids, alkenoyl hydroxamic acids and combinations thereof.

12. The process according to claim 1 wherein said hydrophobicity-enhancing reagent produced by reacting a polybasic acid anhydride and an unsaturated monomer.

13. The process according to claim 1 wherein said hydrophobicity-enhancing reagent comprises a heat polymerized linseed oil wherein said linseed oil is polymerized in the presence of maleic anhydride under oxygen deficient conditions.

14. The process of claim 13 wherein said polymerized linseed oil is crosslinked with pentaerythritol.

15. The process according to claim 1 wherein said slurry comprises diamond ore.

16. A process for separating diamonds from a slurry, wherein said diamonds include films of mineral salts causing secondary hydrophilization comprising:
    adding sodium silicate to said slurry, wherein said sodium silicate is added in an amount exceeding 300 mg/l, thereby reducing the effects of said secondary hydrophilization on the surface of said diamonds in said slurry thereby increasing the hydrophobicity of said diamonds;
    adding at least one hydrophobic hydrophobicity-enhancing reagent to said slurry, said hydrophobicity-enhancing reagent at least partially adsorbing on said diamonds and further increasing the hydrophobicity of said diamonds; and
    effecting separation by a grease table.

* * * * *